US008516468B2

(12) United States Patent
Ng et al.

(10) Patent No.: US 8,516,468 B2
(45) Date of Patent: Aug. 20, 2013

(54) MULTIVERSIONING IF STATEMENT MERGING AND LOOP FUSION

(75) Inventors: John L. Ng, San Jose, CA (US); Robert Cox, Mountain View, CA (US); Dmitry V. Budanov, Berdsk (RU)

(73) Assignee: Intel Corporation, Santa Clara, CA (US)

( * ) Notice: Subject to any disclaimer, the term of this patent is extended or adjusted under 35 U.S.C. 154(b) by 1420 days.

(21) Appl. No.: 12/215,983

(22) Filed: Jun. 30, 2008

(65) Prior Publication Data

US 2009/0328021 A1 Dec. 31, 2009

(51) Int. Cl.
*G06F 9/45* (2006.01)
(52) U.S. Cl.
USPC .......................................................... 717/160
(58) Field of Classification Search
USPC .......................................................... 710/160
See application file for complete search history.

(56) References Cited

U.S. PATENT DOCUMENTS

| | | | | |
|---|---|---|---|---|
| 5,805,863 | A |   | 9/1998 | Chang ........................... 395/500 |
| 5,822,593 | A | * | 10/1998 | Lamping et al. ............... 717/161 |
| 6,192,515 | B1 | * | 2/2001 | Doshi et al. .................... 717/161 |
| 6,651,246 | B1 | * | 11/2003 | Archambault et al. ........ 717/160 |
| 2009/0064117 | A1 | * | 3/2009 | Bashkansky et al. .......... 717/154 |
| 2009/0083702 | A1 | * | 3/2009 | Eichenberger et al. ........ 717/109 |

OTHER PUBLICATIONS

Fraboulet, Antoine et al. Loop Fusion for Memory Space Optimization. ISSS'01, Oct. 13, 2001, Montreal, Quebec, Canada. Copyright 2001 ACM 1581134185/01/0010.*
Rugina, Radu et al. Recursion Unrolling for Divide and Conquer Programs. 2001. LCPC '00 Proceedings of the 13th International Workshop on Languages and Compilers for Parallel Computing-Revised Papers pp. 34-48.*
Nijhar, T.P.K. et al. Source level optimisation of VHDL for behavioural synthesis. 1996. IEE Proc.-Comput. Digit. Tech., vol. 144, No. 1, Jan. 1997.*
Keith D. Cooper, "Fast Interprocedural Alias Analysis," 1989, pp. 49-59.
John Ng, et al, "Inter-procedural Loop Fusion, Array Contraction and Rotation," 2003, pp. 1-11.
Randy Allen, et al., "Automatic Translation of Fortran Programs to Vector Form," Oct. 1987, pp. 491-542.

\* cited by examiner

*Primary Examiner* — Hyun Nam
*Assistant Examiner* — Eric Oberly
(74) *Attorney, Agent, or Firm* — Trop, Pruner & Hu, P.C.

(57) ABSTRACT

In one embodiment of the invention, a method for fusing a first loop nested in a first IF statement with a second loop nested in a second IF statement without the use of modified and referenced (mod-ref) information to determine if certain conditional statements in the IF statements retain variable values.

20 Claims, 4 Drawing Sheets

MULTIVERSIONING IF STATEMENT MERGING AND LOOP FUSION

BACKGROUND

Various techniques are used to help computer memory access speeds keep up with increases in computer processor speeds. For example, these techniques may include applying loop and data transformations to improve the locality of data referenced by a computer program. Specifically, compilers may apply loop fusions, linear loop transformations, loop distributions, array contractions, and many other transformations to increase memory access speed.

Specifically regarding loop fusion, this technique involves, for example only, combining two or more loops to form a single loop (or fewer loops). Loop fusion may take advantage of the proximity of data referenced in loops that are located adjacent to one another in program code. Loop fusion may combine the cache context of multiple loops into a single new loop. Thus, data accessed by various nested loops (i.e., a loop embedded in another loop) may, after loop fusion, be accessed from within the same new nested loop, thereby potentially reducing the number of memory accesses. Loop fusion may increase opportunities for reducing the overhead of array references by replacing them with references to compiler-generated scalar variables. Loop fusion may also improve the effectiveness of data prefetching. Certain other transformations such as linear loop transformations, loop peeling, and loop alignment can expose more opportunities for loop fusion.

Data access behavior with memory optimizations and memory reuse can be further optimized across procedures (e.g., named sequence of statements that usually performs a single task), loops, and IF statements. For example, IF and ELSE statements may be merged together thereby enabling loop fusion. IF statement merging involves, for example only, combining two or more IF statements (e.g., IF-nests) into a single IF-nest (or fewer nests). The fused loop may then improve reuses of memory references and avoid redundant computations.

BRIEF DESCRIPTION OF THE DRAWINGS

The accompanying drawings, together with the description of the invention, explain such various embodiments of the invention. In the drawings.

DETAILED DESCRIPTION

Figure 1:
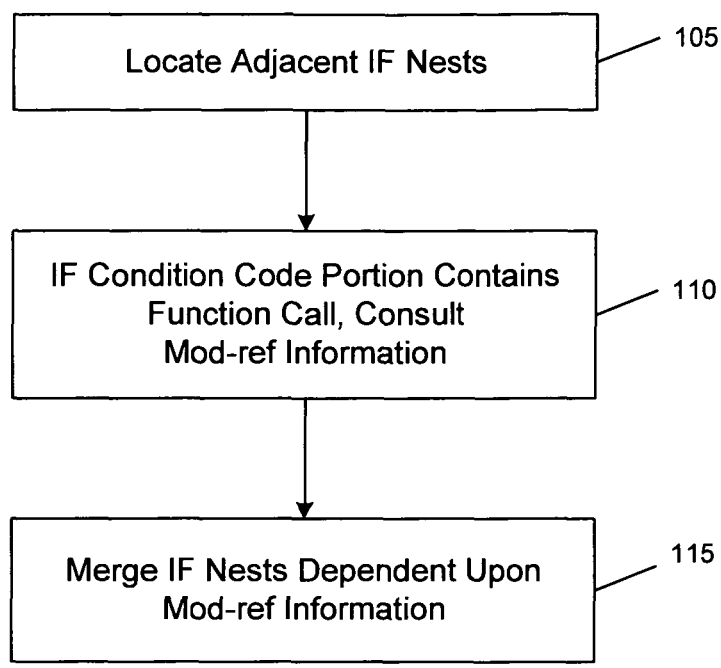
FIG. 1 is a block diagram for loop fusion in the prior art.

FIG. 1 is a block diagram for a loop fusion method 100 in the prior art. In block 105, adjacent IF nests are located. For example, the following Pseudocode Example 1 illustrates two adjacent sets of IF and ELSE statements (e.g., the IF and ELSE statements are located substantially adjacent to each other in the source code).

```
*********************
//Pseudocode Example 1
//This is the first nested IF statement
If (condition1) {
    Statement1a;
    Function_call1a ( );
    ...
}
else if (condition2) {
    Statement2a;
    Function_call2a ( );
}
else if (condition3) {
    Statement3a;
    Function_call3a ( );
}
//This is the second nested IF statement
If (condition1) {
    Statement1b;
    Function_call1b ( );
    ...
}
else if (condition2) {
    Statement2b;
    Function_call2b ( );
}
else if (condition3) {
    Statement3b;
    Function_call3b ( );
}
*********************
```

In this particular example, the two nested IF statements have the same condition expressions. A condition may be a state of an expression or a variable such as when a result can be true or false, or equal or not equal. A condition expression (e.g., conditional), for example without limitation, may include expressions that involve comparisons (testing values for equality, <[less than], >[greater than]) and/or logical combinations of Boolean expressions. Thus, each nested IF statement in the above pseudocode has the same condition expressions because each IF statement includes condition1, condition2, and condition3 expressions.

In block 110 a determination is made regarding whether certain code portions include function calls. For example, the condition1 code portion in the first nested IF statement includes Function_call1a ( ) and Statement1a. The condition2 code portion in the first nested IF statement includes Function_call2a ( ) and Statement2a. The importance of determining the existence of function calls in the condition code portions is addressed more fully in connection with block 115 of FIG. 1.

A function call may include a program's request for the services of a particular function. The function itself can be a part of the program, be stored in another file and brought into the program when the program is compiled, or be a part of the operation system. A function call may call a statement, such as statement1a in the Pseudocode Example 1. A statement may be considered to be an executable entity within a programming language. Furthermore, a function call may be a function call for a procedure. For example, Function_call1a may call for a procedure. In addition to function calls, a loop may be included in various devices such as, for example, statement1a.

In block 115 the two nested IF statements in Pseudocode Example 1 may be merged together if the variables used in the conditionals or condition expressions (e.g., condition1, condition2, condition3) are not changed in between the two nests. For instance, the nested IF statements may be merged as shown in the following Pseudocode Example 2 if Function_call1a and Statement1a do not alter the values of variables in the condition1 code portion.

```
**********************
//Pseudocode Example 2
//The two nested IF statements from Pseudocode Example 1
are merged below into a
//single nested IF statement
If (condition1) {
   Statement1a;
   Function_call1a ( );
   ...
   Statement1b;
   Function_call1b ( );
   ...
}
else if (condition2) {
   Statement2a;
   Function_call2a ( );
   Statement2b;
   Function_call2b ( );
}
else if (condition3) {
   Statement3a;
   Function_call3a ( );
   Statement3b;
   Function_call3b ( );
}
**********************
```

The importance of determining whether function calls exist in condition code portions (see Block 110) is now discussed more fully. Specifically, the presence of function calls (i.e., call statements) in the condition code portions of Pseudocode Example 1 may pose a problem for merging the nested IF statements. For example, variable values may be changed as a result of a call statement. To accommodate situations where variable values might change due to a function call, the presence of a function call statement may necessitate the review of inter-procedural ("IP") modified and referenced ("mod-ref") information. As an example of "mod-ref" information, assuming a function is of this form void *fcnA (int*a) {*a=b; c=d+1;}, then the mod-set of fcnA is {*a,c} and the ref-set for fcnA is {b, d}. The IP mod-ref information may be used to determine whether any such variables are modified or changed due to function calls (e.g., Function_call1a ( ), Function_$_{1\ call1}$b). In prior methods where loop fusion is done by merging the IF nests together, if the conditions are changed due to, for example, a call function, then IF merging and loop fusion cannot occur. Thus, in block 115 the nested IF statements may be merged but they may only be merged dependent upon the mod-ref information. In other words, the mod-ref information may be used in determining whether original variable values associated with a condition code portion (e.g., condition1 code portion) are changed. If the values are retained (i.e., unchanged), as indicated by the mod-ref information, IF merging may occur. For example, [if (a) {fcn( ); stmt1}; if (a) {stmt2}] becomes [if (a) {fcn( ); stmt1; stmt2}] only when (a) is not changed by fcn( ). However, if the mod-ref information indicates the original values are not properly retained (i.e., they change), the original second nested IF statement (see Pseudocode Example 1) would incorrectly vary from its form in the merged IF statements (see Pseudocode Example 2). In this case, IF merging and loop fusion would not be possible.

The mod-ref information is important because, for example, global variables are often used in Boolean conditions. Global variables are often updated with control flows (e.g., non straight line code with GOTO and label statements). Many compilers, however, may not be able to compute the precise mod-ref sets that are flow-sensitive. Consequently, the traditional method of merging the IF statements to enable loop fusion may be impossible or undesirable when function calls are present in the condition nests or condition code portions. In other words, merging IF statements that have function calls may require exact IP mod-ref information. It may be difficult, however, to obtain accurate mod-ref information regarding whether certain conditionals used in the IF statements retain their original value. Thus, even with mod-ref information, merging IF statements that contain function calls can be difficult.

Figure 2:
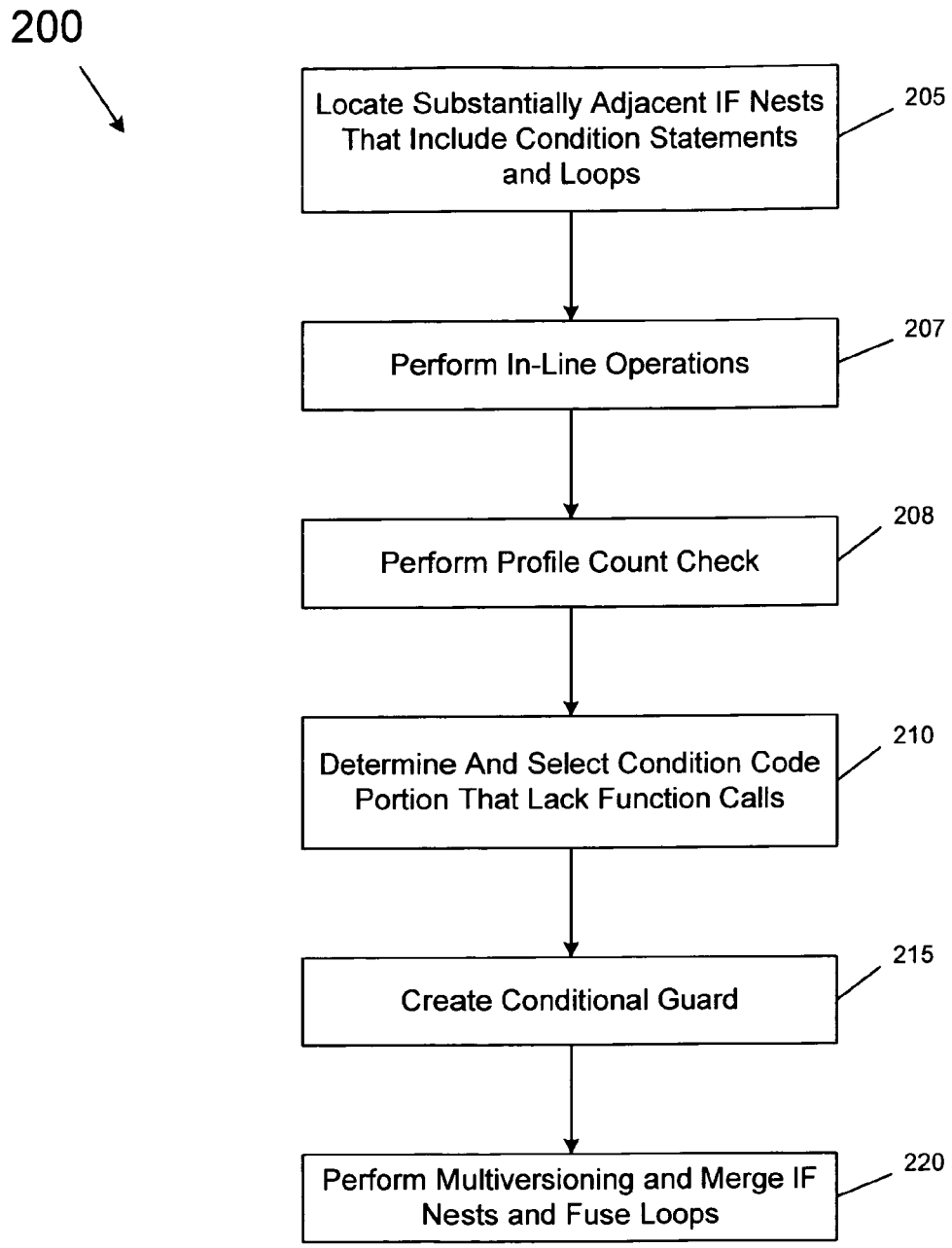
FIG. 2 is a block diagram of a method in one embodiment of the invention.

FIG. 2 is a block diagram of a method 200 in one embodiment of the invention. In block 205, adjacent or substantially adjacent IF statements (e.g., IF nests) are located and selected as candidates for optimization. In one embodiment of the invention, the candidate IF nests need not include identical condition expressions and/or condition code portions. For example, Pseudocode Example 3 (see below) is a pseudocode representation of nested IF statements in one embodiment of the invention. The first nested IF statement has code portions for condition1, condition2, and condition3 but the second nested IF statement has code portions only for condition2 and condition3.

```
**********************
//Pseudocode Example 3
//This is the first nested IF statement
if (condition1) {
   Statement1a;
   Function_call1a ( );
   ...
}
else if (condition2) {
   Statement2a;
   Function_call2a ( );
   ...
}
else if (condition3) {
   for (i=0; i<n; i++) { // loop3a
      p += a[i];
   }
}
//This is the second nested IF statement
if (condition2) {
   Statement2b;
   Function_call2b ( );
   ...
}
//condition3 code portion begins
else if (condition3) {
   for (i=0; i<n; i++) { //loop3b
      p += a[i];
   }
}
//condition3 code portion ends
**********************
```

In block 207 inlining may be performed to incorporate the body of potential function calls into the main code. Inlining may refer to a function call replaced with an instance of the function's body. Thus, for Pseudocode Example 3 partially inlining may have already occurred because, for example, Statement1a may have been included in the body of previously present function call (not shown in Pseudocode Example 3). However, the inlining would be only partial because Function_call1a ( ) is still present.

In block 208 a check may be performed for the profile counts of the statements under the IF statements that have the same condition expressions. These profile counts may be either, for example, estimated statically or dynamically. The statements that have certain profile counts that reached a certain threshold may be chosen in one embodiment of the invention. If no such candidate exists, this step may not be continued. Static profile counts refer to the execution counts estimated during compile time analysis, usually based on the nest levels in the calling graph or loops. Dynamic profile counts are obtained by running the program. The profile counts provide information regarding what parts of the program are heavily executed (i.e., hot paths).

In block 210 a determination is made regarding whether any condition code portions (e.g., condition nests) lack function calls. Pseudocode Example 3 illustrates condition3 code portion in the first nested IF statement and condition3 code portion in the second nested IF statement each lack function calls. After determining whether any condition code portions (e.g., condition nests) lack function calls, a condition nest that has no function calls is selected. Avoidance of call statements can be beneficial because, as explained more fully above, in some instances call statements can inhibit code motion due to variable value changes caused by the function. Thus, in Pseudocode Example 3 condition3 code portions in the first and second nested IF statements each lack function calls and may be selected for potential loop fusion.

In block 215 a conditional guard may be created for the selected nested IF statements. In one embodiment of the invention, the condition guard(s) may be constructed similar to guards created when processing IF-conversions for vectorization. The IF-conversion in vectorization refers to the process of converting the IF-nests into statements that are guarded by a combination of the conditions inside a loop that is to be converted as vector constructs. If-nests eventually are converted as IF and GOTO statements. After IF-conversion, no GOTO statements will be generated. For example, if (a) then s1 else if (b) s2; is converted as if (a && !b) s1; if (!a && b) s2. For example, as seen in Pseudocode Example 4 below, the conditional guard for condition3 is (!condition1 && !condition2 && condition3). This exemplar condition guard ensures that condition1 and condition2 are not met but that condition3 is met.

In block 220 the selected condition code portion (e.g., condition3 code portion) is chosen and multi-versioning may be generated to enable loop fusion. In other words, for each selected condition code portion the statements nested under the IF condition expressions may be examined to determine if loop fusion should be enabled. In this example, assuming condition3 code portion is a hot path, an opportunity exists for transformation by merging condition3 code portion of the first nested IF statement with condition3 code portion of the second nested IF statement. Loop fusing may occur even if function call statements are present between, for example, statement1a and statement1b or between statement2a and statement2b. Pseudocode Example 4, shown below, illustrates the code sequence after multi-versioning in one embodiment of the invention.

```
********************
//Pseudocode Example 4
//The two nested IF statements are now merged
//This is Version #1 of Multiversioning
If (!condition1 && !condition2 && condition3) {
    for (i=0; i<n; i++) { // loop3a & loop3b fused
        p += a[i];
        p += a[i];
    }
}
else {
//This is Version #2 of Multiversioning
```

-continued

```
/* The original code from Pseudocode Example 3 now follows
only now this original code is embedded in an else statement
shown immediately above this comment
*/
//This is the first nested IF statement
if (condition1) {
    Statement1a;
    Function_call1a ( );
    ...
}
else if (condition2) {
    Statement2a;
    Function_call2a ( );
    ...
}
else if (condition3) {
    for (i=0; i<n; i++) { // loop3a
        p += a[i];
    }
}
//This is the second nested IF statement
if (condition2) {
    Statement2b;
    Function_call2b ( );
    ...
}
else if (condition3) {
    for (i=0; i<n; i++) { // loop3b
        p += a[i];
    }
}
********************
```

Once condition3 code portions from the first and second IF statements are merged, loop fusion may occur which may improve locality and redundant computations. This loop fusion may occur even though there was no IF statement merging or only a part of the IF statements are merged. In the above example, only part of the IF statements are merged. Specifically, only the portions of the nested IF statements including loop3a and loop3b are merged but the portions including function call statements are not merged. Thus, multi-versioning enables loop fusion as seen in Pseudocode Example 4. The "first version" includes the IF statement, conditional guard (!condition1 && !condition2 && condition3), and fused loops (Loop3a and Loop3b) while the "second version" has no fused loops and includes the original code located in the ELSE statement.

The previous steps described assume the multi-versioning is done after inlining or partial inlining. For example, in block 207 Pseudocode Example 3 Statement1a may have been inlined. Such inlining may have been performed based on certain heuristics. For example, Statement1a was already determined to include no function call. However, had Statement1a included a function call and had that function call been inlined into the main code, this may have constituted yet another reason, in addition to the presence of Function_call1a ( ) in condition1 code portion, to avoid attempting to merge the condition1 code portion. In other words, if there are function calls present inside condition code portions, those condition code portions may be ruled out as candidates for further transformations. Inlining these condition code portions may help determine whether such function calls are present and whether variable values are changed as a result of such calls. As an example, the source code in Pseudocode Example 3 before inlining might look like: fcn_x1 ( ); fcn_x2 ( ).

Figure 3:
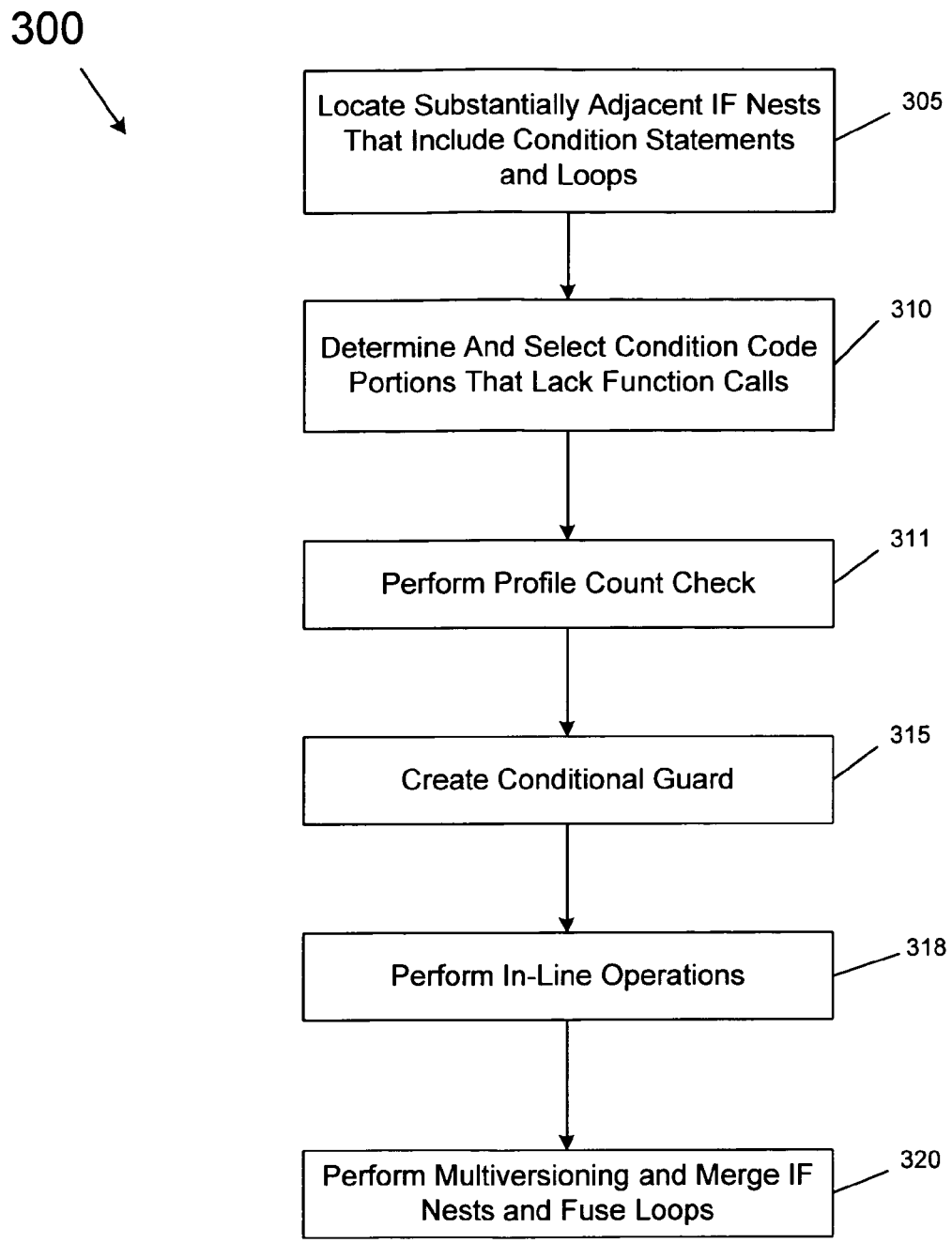
FIG. 3 is a block diagram of a method in one embodiment of the invention.

However, as shown in FIG. 3, multi-versioning may occur during inlining or partial inlining instead of after such inlining occurs. Thus, after IF nests are located in block 305, function call analysis is performed in block 310, profile counts are checked in block 311, conditional guards are formed in 315, inlining may be performed in block 318. Pseudocode Example 5 provides an example of how multi-versioning code may be generated during inlining or partial inlining.

```
********************
//Pseudocode Example 5
//The two nested IF statements are now merged
If (!condition1 && !condition2 && condition3) {
    Loop3a;
    Loop3b;
}
//Original code
/* FunctionC( ) includes
    if (condition1) {
      Statement1a;
      Function_call1a ( );
      ...
    }
    else if (condition2) {
      Statement2a;
      Function_call2a ( );
      ...
    }
    else if (condition3) {
      Loop3a;
    }
*/
/* FunctionD( ) includes
    if (condition2) {
        Statement2b;
        Function_call2b ( );
        ...
    }
    else if (condition3) {
      Loop3b;
    }
}
*/
    else {
      FunctionC( );
      FunctionD( );
    }
********************
```

Thus, in Pseudocode Example 5 FunctionC ( ) and FunctionD ( ) have yet to be inlined. FunctionC ( ) and FunctionD ( ) may collectively call for much of the original code as explained more fully in the comment embedded in Pseudocode Example 5.

Therefore, as shown above, one embodiment of the invention may reduce memory access time through multi-versioning for loop fusion and merging (fully or partially) IF statements. This may enable loop fusion without using any interprocedural (across procedures) mod-ref information. In an embodiment of the invention, multi-versioning may occur after inlining or partial inlining is completed or, alternatively, during partial inlining. Various embodiments of the invention may be used in optimizers of, for example, Intel compilers. This may allow compilers to perform aggressive loop fusion actions that can result in important memory optimization for both serial and multi-threaded applications.

Figure 4:
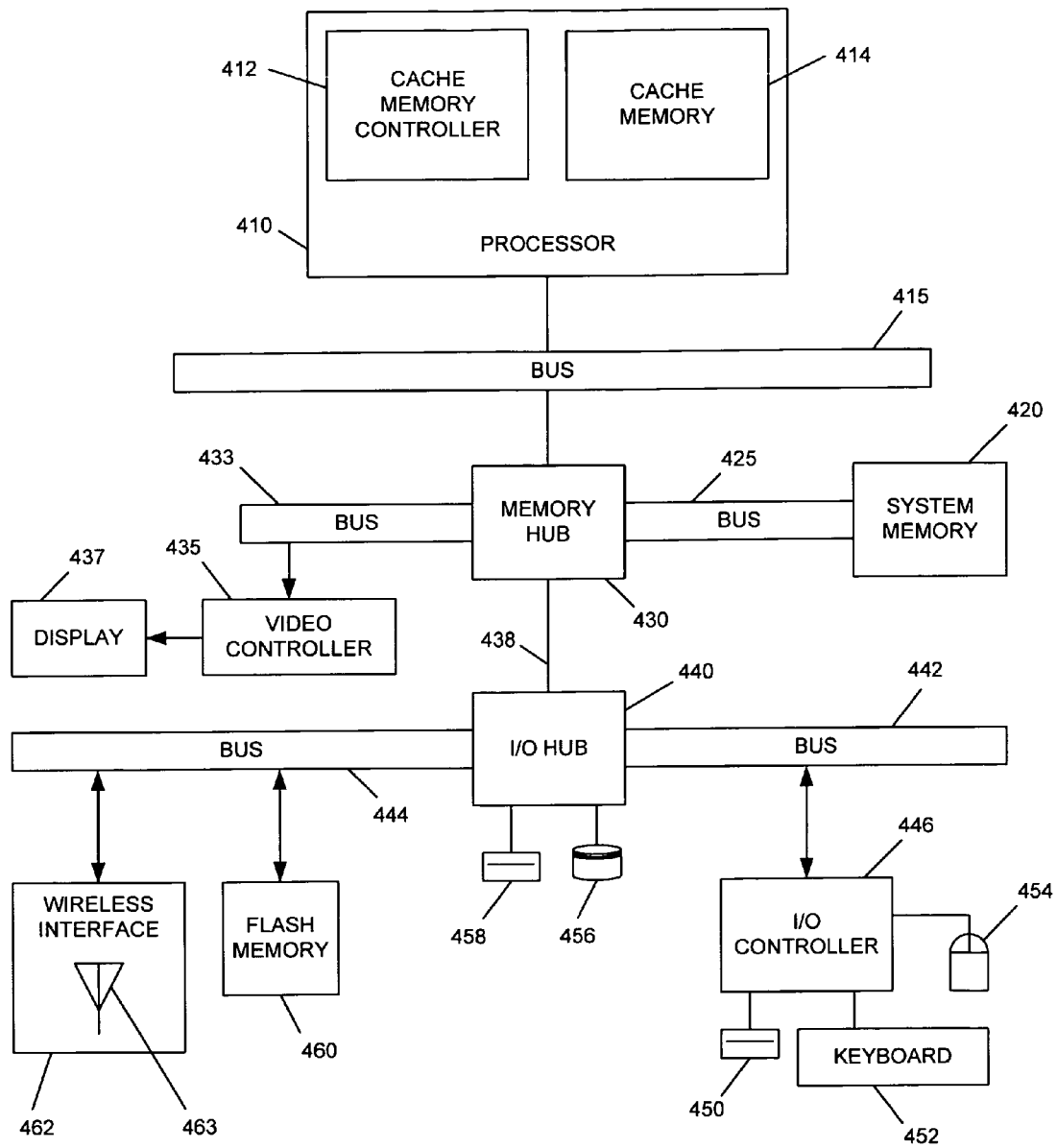
FIG. 4 is a system block diagram for use with one embodiment of the invention.

While the functions herein may be described as being carried out by a particular structure, several components, including the memory controller, operating system, BIOS, run-time software, application software, hardware, firmware, or any combination thereof, may carry out the functions herein without detracting from the scope of the present invention. FIG. 4 is a system block diagram for use with one embodiment of the invention. Computer system 400 includes a processor 410, which may include a general-purpose or special-purpose processor such as a microprocessor, microcontroller, a programmable gate array (PGA), and the like. Processor 410 may include a cache memory controller 412 and a cache memory 414. Processor embodiments may include single or multiple cores and may be a multiprocessor system with multiple processors 410. Processor 410 may be coupled over a host bus 415 to a memory hub 430, which may be coupled to a system memory 420 (e.g., a DRAM) via a memory bus 425. Memory hub 430 may also be coupled over an Advanced Graphics Port (AGP) bus 433 to a video controller 435, which may be coupled to a display 437. Memory hub 430 may also be coupled (via a hub link 438) to an input/output (I/O) hub 440 that is coupled to an input/output (I/O) expansion bus 442 and a Peripheral Component Interconnect (PCI) bus 444, as defined by the PCI Local Bus Specification, Production Version, Revision 2.1 dated June 1995. I/O expansion bus 442 may be coupled to an I/O controller 446 that controls access to I/O device(s). These devices may include storage devices (e.g., disk drive 450) and input devices, such as a keyboard 452 and a mouse 454. I/O hub 440 may also be coupled to, for example, a hard disk drive 458 and a compact disc (CD) drive 456. Other storage media may be included in the system. PCI bus 444 may also be coupled to various components including, for example, a flash memory 460. A wireless interface 462 may be coupled to PCI bus 444, which may be used in certain embodiments to communicate wirelessly with remote devices. Wireless interface 462 may include a dipole or other antenna 463 (along with other components not shown). While such a wireless interface may vary in different embodiments, in certain embodiments the interface may be used to communicate via data packets with a wireless wide area network (WWAN), a wireless local area network (WLAN), a BLUETOOTH™, ultrawideband, a wireless personal area network (WPAN), or another wireless protocol. In various embodiments, wireless interface 462 may be coupled to system 400, which may be a notebook or other personal computer, a cellular phone, personal digital assistant (PDA) or the like, via an external add-in card or an embedded device. In other embodiments wireless interface 462 may be fully integrated into a chipset of system 400. In one embodiment of the invention, a network controller (not shown) may be coupled to a network port (not shown) and the PCI bus 444. Additional devices may be coupled to the I/O expansion bus 442 and the PCI bus 444. Although the description makes reference to specific components of system 400, it is contemplated that numerous modifications and variations of the described and illustrated embodiments may be possible. Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access-memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method including:
locating a nested first IF statement and a nested second IF statement, wherein (a) the first IF statement includes a first conditional code portion that includes a first condition expression and a first loop, (b) the second IF statement includes a second conditional code portion that includes a second condition expression and a second loop, and (c) the first and second IF statements are not nested within one another;
determining whether the first conditional code portion includes a first function call;
determining whether the second conditional code portion includes a second function call;
determining whether the first condition expression and the second condition expression are based on a common condition; and
fusing the first loop with the second loop based on determining the first conditional code portion does not include the first function call, determining the second conditional code portion does not include the second function call, and determining the first condition expression and the second condition expression are based on the common condition.

2. The method of claim 1, further comprising partially merging the first IF statement with the second IF statement.

3. The method of claim 1, further comprising fusing the first loop with the second loop without basing the fusion on mod-ref information.

4. The method of claim 1, further comprising inlining the first IF statement and the second IF statement while fusing the first loop with the second loop.

5. The method of claim 1, further comprising determining a first conditional guard based on determining the first conditional code portion does not include the first function call and determining the second conditional code portion does not include the second function call.

6. The method of claim 1, further comprising:
determining a third conditional code portion, included in the first IF statement, includes a third condition expression, a third function call, and a third loop;
determining a fourth conditional code portion, included in the second IF statement, includes a fourth condition expression, a fourth function call, and a fourth loop, the fourth condition expression and the third condition expression being based on an additional common condition; and maintaining the third loop unfused with the fourth loop based on the third conditional code portion including the third function call.

7. The method of claim 1, further comprising fusing the first loop with the second loop in a first program version and maintaining the first loop unfused with the second loop in a second program version, a first set of instructions operable by a processor including the first program version and the second program version.

8. An article comprising a non-transitory medium storing instructions that enable a processor-based system to:
locate a nested first IF statement and a nested second IF statement, wherein (a) the first IF statement includes a first conditional code portion that includes a first condition expression and a first loop, (b) the second IF statement includes a second conditional code portion that includes a second condition expression and a second loop, and (c) the first and second IF statements are not nested within one another;
determine whether the first conditional code portion includes a first function call;
determine whether the second conditional code portion includes a second function call;
fuse the first loop with the second loop based on determining the first conditional code portion does not include the first function call and determining the second conditional code portion does not include the second function call.

9. The article of claim 8, further storing instructions that enable the processor-based system to partially merge the first IF statement with the second IF statement.

10. The article of claim 8, further storing instructions that enable the processor-based system to fuse the first loop with the second loop without basing the fusion on mod-ref information.

11. The article of claim 8, further storing instructions that enable the processor-based system to inline the first IF statement and the second IF statement before fusing the first loop with the second loop.

12. The article of claim 8, further storing instructions that enable the processor-based system to fuse the first loop with the second loop in a first program version and maintain the first loop unfused with the second loop in a second program version.

13. The article of claim 8, further storing instructions that enable the processor-based system to:
determine a third conditional code portion, included in the first IF statement, includes a third condition expression, a third function call, and a third loop;
determine a fourth conditional code portion, included in the second IF statement, includes a fourth condition expression, a fourth function call, and a fourth loop, the fourth condition expression being equal to third condition expression; and
maintaining the third loop unused with the fourth loop based on the third conditional code portion including the third function call.

14. An apparatus comprising:
a processor to: (a) locate a nested first IF statement and a nested second IF statement, wherein (a)(i) the first IF statement includes a first code portion that includes a first condition expression and a first loop, (b) the second IF statement includes a second code portion that includes a second condition expression and a second loop, and (a)(iii) the first and second IF statements are not nested within one another, (b) determine whether the first code portion includes a first function call,(c) determine whether the second code portion includes a second function call, and (d) fuse the first loop with the second loop based on determining the first code portion does not include the first function call and determining the second code portion does not include the second function call; and
a memory coupled to the processor.

15. The apparatus of claim 14, wherein the processor is to partially merge the first IF statement with the second IF statement.

16. The apparatus of claim 14, wherein the processor is to fuse the first loop with the second loop without basing the fusion on mod-ref information.

17. The apparatus of claim 14, wherein the processor is to fuse the first loop with the second loop in a first program version and maintain the first loop unfused with the second loop in a second program version.

18. The apparatus of claim 14, wherein the processor is to determine a first conditional guard based on determining the first condition expression does not include the first function call and determining the second condition expression does not include the second function call.

19. The method of claim 1, further comprising:
   determining a third conditional code portion, included in the first IF statement, includes a third condition expression and a third function call;
   determining a fourth conditional code portion, included in the second IF statement, includes a fourth condition expression and a fourth function call, the fourth condition expression and the third condition expression being based on an additional common condition; and
   maintaining the third conditional code portion unfused with the fourth conditional code portion based on the third conditional code portion including the third function call.

20. The method of claim 1, wherein at least one additional IF statement is nested within the first IF statement.

\* \* \* \* \*